June 14, 1949.      W. M. BAKER      2,473,189
GLASS CUTTER
Filed Feb. 2, 1945
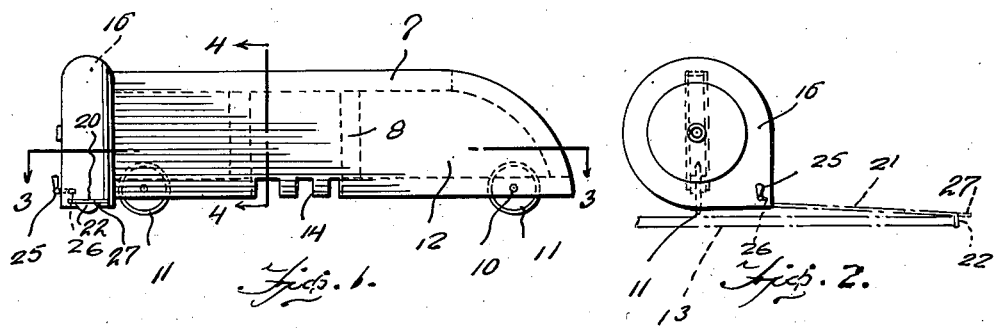
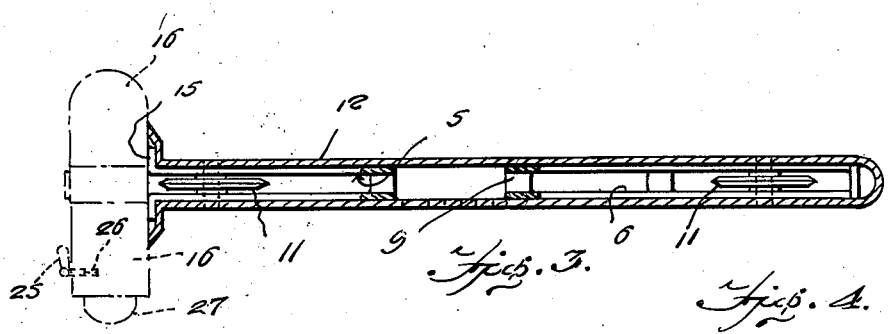
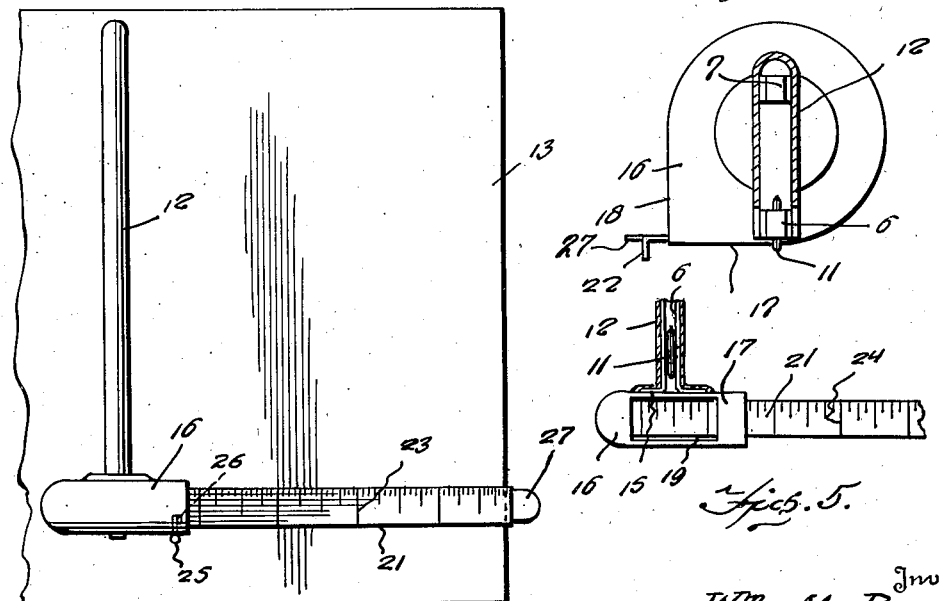
Inventor
Wm. M. Baker Patented June 14, 1949

2,473,189

UNITED STATES PATENT OFFICE 2,473,189

GLASS CUTTER

William M. Baker, Clyde, N. Y.

Application February 2, 1945, Serial No. 575,809

3 Claims. (Cl. 33—42)

The present invention relates to new and useful improvements in glass cutters and has for its primary object to provide a measuring tape carried by the cutter whereby to provide means for measuring the size of the glass to be cut formed as a unitary part of the cutter.

It is the usual practice in cutting glass to utilize a yard stick, tape or other measuring device and frequently when it is desired to cut a piece of glass the measuring device may be misplaced or lost, thus causing considerable delay and annoyance in completing the job.

In order to overcome this difficulty and loss of time it is an object of the present invention to attach a spring wound measuring tape directly to the glass cutter so that the measuring tape will always be available for use when it is desired to measure and cut a piece of glass to a desired size.

A further object of the invention is to provide a glass cutter embodying a pair of glass cutting wheels journaled at the opposite ends of a frame forming a handle whereby the cutter may be rolled over the surface of the glass to perform the cutting action. This construction enables the operator to exert the necessary downward pressure on the cutter to effectively accomplish the cutting of the glass.

It is also an object of the invention to rigidly attach the frame to the cutter directly to the housing for the spring wound measuring tape to thus provide a strong unitary structure.

Another object of the invention is to provide an article of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view.

Figure 2 is an end elevational view showing the housing for the measuring tape.

Figure 3 is a fragmentary longitudinal sectional view taken substantially on the plane of the line 3—3 of Figure 1.

Figure 4 is a vertical sectional view taken substantially on a line 4—4 of Figure 1.

Figure 5 is a fragmentary bottom plan view of the housing for the measuring tape and with parts broken away and shown in section, and Figure 6 is a plan view showing the measuring tape in use for measuring a piece of glass prior to cutting thereof.

Referring now to the drawings in detail wherein for the purpose of illustration I have disclosed a preferred embodiment of the invention, the numeral 5 designates a frame composed of spaced parallel horizontal lower frame members 6 and similar upper frame members 7 supported in vertically spaced relation by upstanding posts or braces 8 and cross braces 9.

Pins or axles 10 are journaled between the lower pairs of frame members 6 for rotatably supporting beveled glass cutting wheels 11 at the lower edges of the frame and with a portion of the cutter projecting downwardly below the frame as will be apparent from an inspection of Figure 1 of the drawings.

The frame 5 is enclosed within a plastic casing 12 which is open at its bottom, the casing and frame thus forming a handle by means of which the cutters 11 may be moved over the surface of a sheet of glass such as indicated at 13 for cutting the latter.

The lower frame members 6 are separated longitudinally and the lower edges of the cover 12 at said separated portion is formed with a plurality of notches 14 of various widths and adapted to receive an edge of the glass for the purpose of breaking the same along the cut line in a manner well known in the art.

One end of the frame 5 is formed with laterally extending flanges 15 adapted for welding or otherwise fixedly securing to the side of a substantially annular housing 16.

The bottom of the housing 16 is flattened as indicated at 17 and one side edge of the housing is also flattened as indicated at 18.

The bottom 17 is formed with a window opening 19 and the bottom edge of the flattened side 18 is formed with a slot 20 through which a flexible measuring tape 21 is movable into and out of the housing.

The outer end of the tape 21 is formed with a hook 22 adapted for engaging over the edge of the glass 13 as indicated in Figure 2 of the drawings and the tape is adapted for winding around a spring drum of conventional construction journaled in the walls of the housing, the spring drum serving to retract the tape for winding on the drum upon releasing of the hook 22 from the edge of the glass. A tab 27 may extend beyond the hook 22 to provide a finger grip and facilitate use of the tape as will appear later.

The upper surface of the tape is formed with graduations 23 in inches and fractions thereof and similar graduations 24 are marked on the bottom surface of the tape.

The tape 21 projects laterally with respect to the cutters 11 so that after the width of the glass to be cut is determined the cutters 11 are rolled along the surface of the glass to cut the same at the desired designated width.

The tape 21 may be secured in its extended position against retracting movement by means of a locking lever indicated at 25 which is pivotally mounted in one side of the casing 16 and includes a cam member 26 within the housing and adapted to overlie the tape 21 and lock the same against the bottom of the case. Thus, the tape is extended the desired distance so that the appropriate length designating indicia 24 on the underside of the tape is aligned with the cutter wheels 11. The window 19 in the bottom 17 facilitates this. Then the tape is locked in such extended position by the lever 25 and cam 26. Thereafter, hook 22 is hooked over a straight edge of a glass work piece and so maintained while the device is moved in a direction parallel to such edge to cut the glass. This is accomplished by grasping the finger grip or tab 27 in one hand and the housing in the other. Tab 27 protects the operator's fingers against being cut by the sharp glass edge. Thus, the locked tape and hook 22 comprise a combined cutting gauge and handle throughout the cutting operation.

By providing the measuring tape as a unitary part of the cutter the measuring and cutting of the glass is greatly facilitated.

In view of the foregoing description taken in conjunction with the accompanying drawings it is believed that a clear understanding of the construction, operation and advantages of the device will be quite apparent to those skilled in this art. A more detailed description thereof is accordingly deemed unnecessary.

It is to be understood, however, that even though I have herein shown and described a preferred embodiment of my invention that the same is susceptible to certain changes fully comprehended by the spirit of the invention as herein described and the scope of the appended claims.

Having thus described the invention, what I claim is:

1. In combination, a housing including a pair of spaced and parallel side walls, a pair of glass cutting wheels including cutting edges, means mounting said wheels between said walls with said cutting edges in alignment and extending below said walls for rolling engagement with a glass work piece, a coiled measuring tape including a free end, means mounting said tape on said walls across one end thereof, said free end being adapted to be extended laterally of said walls whereby to provide an extended portion of said tape extending across a vertical plane defining said aligned cutting edges and at right angles thereto, a hook fixed to said free end of said tape and depending therefrom, said hook being adapted to slidably engage an edge of said work piece, a finger grip formed on said free end of said tape, said tape being formed and inscribed with calibrating indicia selectively and visually alignable with said aligned cutting edges, and means for locking said tape in a selected extended position, whereby said extended portion of said tape, hook and finger grip comprise a combined gauge and handle for the cutting of said work piece parallel to a hook-engaged edge thereof.

2. In combination, an elongated hollow body having outer and inner ends, said body being rounded-out taperingly at its outer end, a substantially closed housing, means mounting said housing transversely of said inner end of said body, said body and housing being formed with open bottoms lying in a common and substantially horizontal plane, a pair of glass-cutting wheels including cutting edges, means mounting said wheels in said body adjacent said ends thereof, with portions of said cutting edges extending below said open bottom, said housing being formed with a slot therein, said slot being laterally directed relative to said body, a measuring tape, means mounting said measuring tape in said housing, said tape including a free end extensible through said slot across a vertical plane defined by said cutting edges of said wheels, and means for locking said tape in a selected extended position.

3. A glass cutting device comprising a hollow T-shaped member, said member having a flat bottom surface, said member including a cross head and a stem, said member being closed at the top, sides, ends, said member being open at the bottom, said cross head of said member having parallel side walls intersecting said stem in vertical planes at right angles thereto, said cross head having a right-angularly disposed end wall forming a corner with said flat bottom surface, a measuring tape, spool means mounting said tape within said cross head, said end wall of said cross head being formed with a slot therein adapted for the extension of said tape therethrough, said tape including a free end, an angular hook and finger grip fixedly carried by said free end, and means for locking said tape in a selected extended position.

WILLIAM M. BAKER.

REFERENCES CITED

The following references are of record in the file of this patent:

UNITED STATES PATENTS

| Number | Name | Date |
|---|---|---|
| 491,715 | Mondor | Feb. 14, 1893 |
| 781,211 | Kinkade | Jan. 13, 1905 |
| 1,150,860 | Graham | Aug. 24, 1915 |
| 1,535,816 | Dabney | Apr. 28, 1925 |
| 1,986,551 | Anderson | Jan. 1, 1935 |
| 2,023,408 | Coll | Dec. 10, 1935 |
| 2,194,307 | Jackson | Mar. 19, 1940 |

FOREIGN PATENTS

| Number | Country | Date |
|---|---|---|
| 18,456 | Great Britain | 1913 |